Patented Feb. 14, 1928.

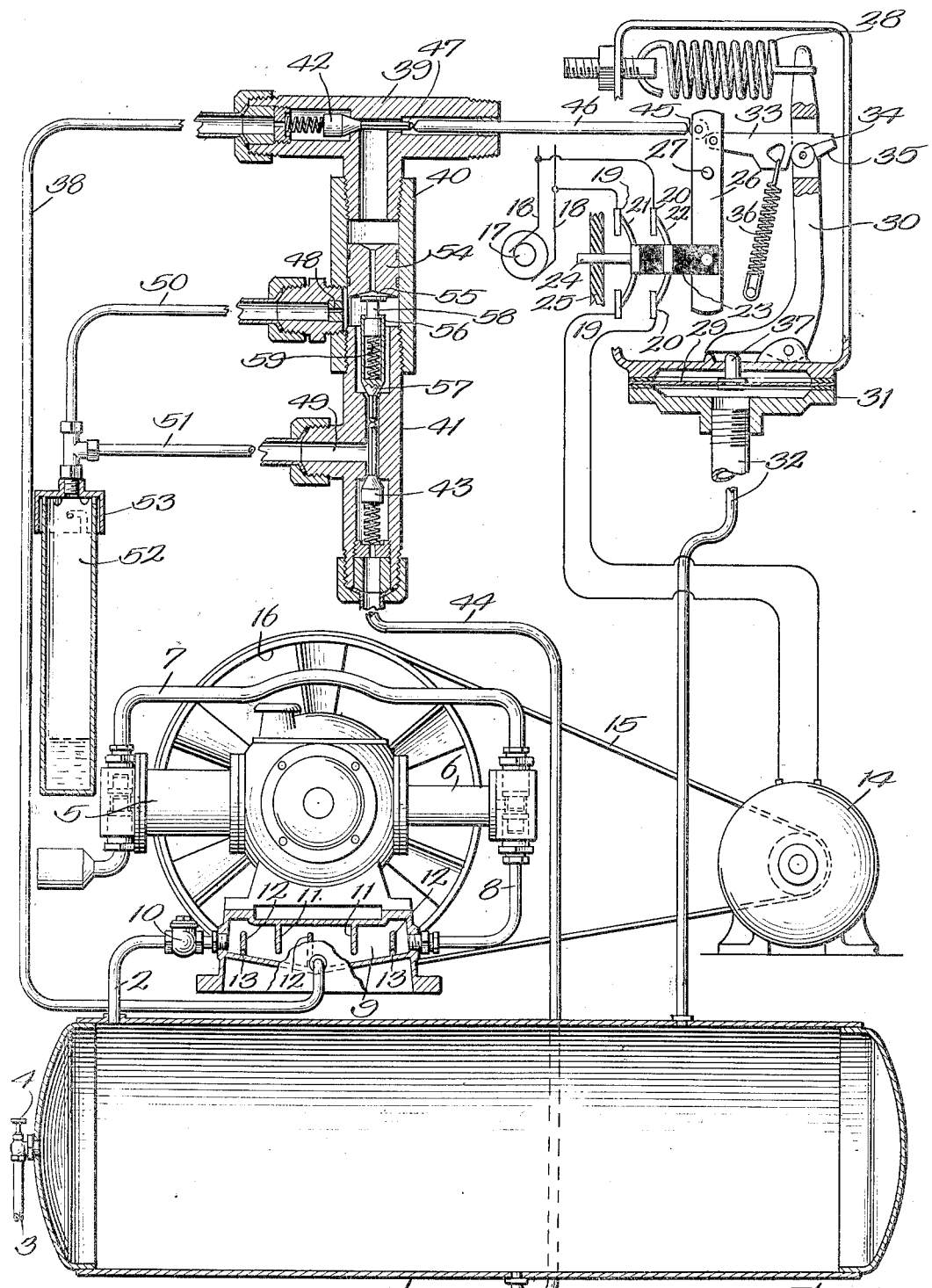

1,659,290

UNITED STATES PATENT OFFICE.

GEORGE W. GILLE, OF BRYAN, OHIO, ASSIGNOR TO THE BRYAN SCREW MACHINE PRODUCTS COMPANY, OF BRYAN, OHIO, A CORPORATION OF OHIO.

APPARATUS FOR COMPRESSING AIR.

Application filed July 13, 1927. Serial No. 205,413.

My invention relates to apparatus for compressing air and is inclusive of a storage tank in which the air is held under compression and from which the air is to be supplied for use. Moisture condenses within such a tank and is accumulated in the bottom thereof, it being customary to provide a hand operated valve through which the water or liquid is discharged from time to time, such a valve being particularly of importance where the piping is subject to freezing temperature. The objection to such a valve is that it is not operated frequently enough nor are means generally provided to indicate when it should be operated. It is the object of my invention to provide automatically operating means for effecting the discharge of the liquid, this means having, in accordance with my invention, opening influence of short duration upon the valve whereby the air under pressure may not be wastefully spent in effecting the discharge of liquid from the tank.

In the preferred embodiment of the invention, this means is operable by the air pressure from the tank when this pressure reaches a predetermined amount. The means through which the air pressure operates, when attaining the predetermined value, is desirably the controlling device that is employed for bringing the air pump driving motor into and out of action, this controlling device being connected with the tank and operable by air supplied thereto from the tank at predetermined pressure to bring the motor out of action. When the controlling device operates to bring the motor out of action, it, at the same time, opens the valve momentarily. The means which I preferably employ to open the valve momentarily is inclusive of a chamber of limited or small capacity with respect to the capacity of the tank and in which air is also received under pressure, the air in this chamber being released by the controlling device when this device causes the motor to stop and then functioning to have opening action upon the valve. The chamber is desirably interposed between the air pump and the tank whereby the pump discharges into the tank through the chamber, a check valve being interposed between the tank and the chamber to permit flow of air from the chamber into the tank and prevent the return flow of the air, whereby air under sufficient pressure is present in the chamber to perform the valve opening function. The air in the chamber desirably opens the discharge valve through the intermediation of another valve which is normally held open by the first valve but which has opening action upon the first valve when subject to the pressure of the air in said chamber.

The invention will be more fully explained by reference to the accompanying drawing which is somewhat diagrammatic, the drawing illustrating parts of the apparatus in section and parts in elevation, an electric motor being illustrated in driving relation to the air pump and having its circuit opened and closed by a switch which is governed by the pressure of air within the tank.

The storage tank 1 is of a suitable size. Air is pumped into this tank through a pipe 2 and is taken for use through a pipe 3 whose connection with the tank is governed by a hand valve 4. The air pump illustrated is of the two-stage construction, air being initially compressed in the low pressure cylinder 5 and being supplied from this cylinder to the high pressure cylinder 6 through the pipe 7, the air being further compressed in the latter cylinder. The pipe 8 conveys the air under the higher pressure to the chamber 9 which is interposed between the pipes 2 and 8 so that air which is supplied by the pump to the storage tank passes through said chamber. A check valve 10 is interposed between the tank and chamber, this check valve permitting flow of air from the chamber into the tank and preventing return flow of the air. The bottom of the chamber slopes, being preferably of blunt V-form to constitute a shallow trough. Baffles 11 and 12, carried respectively by the top and bottom of the chamber, serve to define a sinuous passage for the air as it passes through the chamber and to aid in the separation of the water or liquid from the flowing air, this liquid descending to the bottom of the chamber. Holes 13 are provided in the lower ends of the baffles 12 through which the liquid flows to the bottom of the chamber.

The air pump which is thus connected with the storage tank is driven by any suitable means such as the electric motor 14 and belt 15 that couples the motor in driving connection with the fan wheel 16 upon the shaft of the pump. The motor is furnished with operating current from any suitable source such as the generator diagrammatically illustrated at 17, the motor being included in bridge of the mains 18 that extend from the generator. The bridge in which the motor is included contains one pair of contacts 19 and another pair of contacts 20, there being a switch having a circuit closing bridge 21 for electrically connecting the contacts 19 and a bridge 22 for electrically connecting the contacts 20. The bridges 21 and 22 are carried upon a bar of insulation 23 which is suitably guided in its travel as by means of the rod 24, at one end of the bar 23, this rod sliding in a suitable guide 25. The other end of said bar is pivotally connected near one end of a lever 26 which is pivoted near its other end as indicated at 27. This lever is turned upon its pivot to open and close the circuit of the motor. It is turned in a circuit closing direction by the spring 28 and in a circuit opening direction by the diaphragm 29. Said spring and diaphragm operate through the bell crank lever 30 which is pivoted at its elbow upon the exterior of a chamber 31 which houses the diaphragm, this chamber being connected with the storage tank 1 by a pipe 32 in order that the diaphragm may be subjected to operating air pressure from the tank. The levers 26 and 30 are coupled by a link 33 which is pivotally connected, at one end, with the lever 26 and which has changeable connection at its other end with the lever 30. The changeable connection between the latter lever and the link is effected by means of a roller 34 which is provided upon the lever 30 and a notch in the link that receives this roller. The unmounted end of the link has an inclined cam portion 35. A spring 36 pulls the link 33 toward and into engagement with the roller 34. When the pressure has been built up to the predetermined degree in the storage tank, the diaphragm 29 will press upwardly against the bell crank lever 30 through the intermediation of a pin 37 which slides through the diaphragm chamber, the lever 30 being turned clockwise with the obvious effect of opening the motor switch, the cam portion 35 of the link 33 and roller 34 cooperating to turn the lever 26 in a counterclockwise and circuit opening direction about the pivot 27. When the pressure in the storage tank has been reduced to the predetermined extent, the spring 28 will serve to turn the lever 30 in a counterclockwise direction to bring the roller 34 within the notch of the link 33 whereby the lever 26 is turned in a clockwise direction to close the motor switch. Further description of the device that controls the operation of the motor will not be given as such device is so well known to those familiar with the art.

Moisture which is condensed within the chamber 9 and falls to the bottom thereof in the form of water or liquid may be discharged through the pipe 38 whose intake end is connected with the lower portion of said chamber and whose outlet end discharges into a valve device which may be composed of a T fitting 39, a pipe section 40 connected with the stem of the T and a pipe section 41 which constitutes a continuation of the section 40. A spring pressed valve 42 normally closes a port in the head of the T 39 through which fluid is discharged from the pipe 38 into said T. Another spring pressed valve 43 normally closes another port in the piping section 41 through which fluid is discharged into the aforesaid valve device and which flows from the bottom of the storage tank through a pipe 44 whose intake end is at the bottom of said storage tank. When said valves 42 and 43 are opened, any water or liquid that is contained in the chamber 9 and tank 1 is discharged into the valve device that is composed of the elements 39, 40 and 41. When the link 26 is turned in a counterclockwise direction, which occurs when the pressure in the storage tank has reached a predetermined value, a roller 45 upon said link presses upon the rod 46 that enters the head of the T 39, this rod then pressing upon the valve stem 47 of the valve 42 to open this valve. The air under pressure in the chamber 9 then flows through the pipe 38 and into the piping 39, 40, 41 carrying with it any liquid that may have condensed in said chamber. The capacity of said chamber is small, in comparison with the capacity of the tank, so that the duration of flow of air from the chamber is just long enough to permit the air flowing from the chamber to open the valve 43 a sufficient length of time to ensure the discharge of the liquid that may have condensed in the bottom of the tank without, however, permitting an undue amount of air to pass from the tank to empty the liquid from the tank. The liquid passing from the chamber 9 is passed or partially passed through a discharge port 48 in piping section 40 and the liquid passing from the storage tank is passed through a port 49 in the piping section 41. The ports 48 and 49 may discharge in the open air, if desired, though it is preferred to convey the liquid discharged through these ports through pipes 50 and 51 which discharge into a vessel 52 which is open to the air at its upper end and which may be uncoupled from the cap 53 that carries it whenever the vessel is to be emptied.

The air which passes through the chamber 9 of limited capacity for the purpose of momentarily opening the valve 43 to permit of the discharge of liquid from the bottom of the tank 1 desirably functions through a piston 54 which slides in the piping section 40 and which has a small axial bore and a slot 55 in one end through which air and liquid from the pipe 38 may find passage into the port 48. Said piston is quickly operated to bring its lower end into striking engagement with the spring barrel 56 which has a valve formation 57 at its lower end. The piston stem 58 enters the spring barrel and is pressed upon by the spring 59 within this barrel so that the piston is normally placed in its upper position, this spring yielding when the piston is moved downwardly into actuating engagement with the spring barrel. The stem of the valve 43 engages the stem of the valve 57 so that the latter valve is normally held open by the valve 43 and so that the valve 57 will exert opening action upon the valve 43 when the spring barrel 56 and the valve 57 thereon are depressed by the action of the piston 54. When the valve 43 is open the valve 57 is closed to allow sufficient time to permit the air under pressure in the storage tank to eject the liquid from the bottom of the tank, the valve 57 cutting off the access of pressure to the bottom of the piston so that the quickly dying effect of the air from the chamber 9 will not be counteracted by the pressure of the air from the tank. The closure of the valve 57 also prevents the material passage of a strong jet of liquid into the space above it. The port 48 is small, constituting a bleeder passage, while the port 49 is large to permit of the passage of a larger volume of liquid therethrough The discharge port 48 is between the piston and the intermediate valve 57 while the discharge port 49 is between the latter valve and the lowermost valve 43. The size of the passage 48 determines the duration of the opening of valve 43.

Changes may be made without departing from the invention.

Having thus described my invention, I claim:

1. Apparatus of the class described including a storage tank for compressed air, an air pump connected with said tank for supplying air thereto, the connection between said pump and said tank including a chamber and a check valve between said chamber and said tank opening in the direction of the latter, a motor in driving connection with said pump, a motor control device connected with said tank operable by the air therein reaching a predetermined pressure to stop the motor, a valve device, liquid discharge pipes leading from the bottoms of said tank and chamber, respectively, to said valve device, a pair of valves in said valve device for controlling flow through said pipes, respectively, yieldable means holding said valves normally closed, a third valve in said valve device between said pair of valves held normally open by the valve that controls flow through the liquid discharge pipe leading from the tank, said third valve acting when closed to open the valve which normally closes it, a piston in said valve device operable by air from said chamber to close said third valve, said valve device having discharge ports located between said piston and said third valve and between said third valve and the valve that controls flow through the pipe leading from said tank, respectively, and means whereby a predetermined pressure in said tank causes said motor control device to open the valve which controls flow through the pipe leading from said chamber.

2. Apparatus of the class described including a storage tank for compressed air, an air pump connected with said tank for supplying air thereto, the connection between said pump and said tank including a chamber and a check valve between said chamber and said tank opening in the direction of the latter, a valve device, liquid discharge pipes leading from the bottoms of said tank and chamber, respectively, to said valve device, a pair of valves in said valve device for controlling flow through said pipes, respectively, yieldable means holding said valves normally closed, a third valve in said valve device between said pair of valves held normally open by the valve that controls flow through the liquid discharge pipe leading from the tank, said third valve acting when closed to open the valve which normally closes it, a piston in said valve device operable by air from said chamber to close said third valve, said valve device having discharge ports located between said piston and said third valve and between said third valve and the valve that controls flow through the pipe leading from said tank, respectively, and means operable by the air in said tank reaching a predetermined pressure to open the valve that controls flow through the pipe leading from said chamber.

3. Apparatus for compressing air including a storage tank for holding air under pressure; an air pump; a chamber also receiving air from said pump; a normally closed valve through the port of which liquid flows from the tank; and means operable by air supplied from said chamber for opening said valve.

4. Apparatus for compressing air including a storage tank for holding air under pressure; an air pump; a normally closed valve through the port of which liquid flows from the tank; and means for momentarily opening said valve.

5. Apparatus for compressing air including a storage tank for holding air under pressure; an air pump; a normally closed valve through the port of which liquid flows from the tank; and means for momentarily opening said valve operable by the air pressure from the tank, when reaching a predetermined amount.

6. Apparatus for compressing air including a storage tank for holding air under pressure; an air pump; a normally closed valve through the port of which liquid flows from the tank; and means for momentarily opening said valve governed by the tank pressure.

7. Apparatus for compressing air including a storage tank for holding air under pressure; an air pump; a chamber also receiving air from said pump; a normally closed valve through the port of which liquid flows from the tank; means operable by air supplied from said chamber for opening said valve; and means governed by the tank pressure for applying air from said chamber to the aforesaid means.

In witness whereof, I hereunto subscribe my name.

GEORGE W. GILLE.